(12) United States Patent
Swayne et al.

(10) Patent No.: US 9,740,554 B2
(45) Date of Patent: Aug. 22, 2017

(54) METHODS AND SYSTEMS FOR PRIORITIZING REPLACEMENT OF AT LEAST ONE PART FOR VEHICLE FAULT ANALYSIS

(71) Applicant: THE BOEING COMPANY, Huntington Beach, CA (US)

(72) Inventors: Michael T. Swayne, Redmond, WA (US); Samantha Schwartz, Castle Pines, CO (US); Matthew B. Hendrian, Aurora, CO (US); Lukasz Domaradzki, Pomorskie (PL); Nima Barraci, Hessen (DE)

(73) Assignee: THE BOEING COMPANY, Chicago, IL (US)

( * ) Notice: Subject to any disclaimer, the term of this patent is extended or adjusted under 35 U.S.C. 154(b) by 14 days.

(21) Appl. No.: 14/737,604

(22) Filed: Jun. 12, 2015

(65) Prior Publication Data
US 2016/0364285 A1 Dec. 15, 2016

(51) Int. Cl.
*G06F 11/07* (2006.01)
*G06Q 10/06* (2012.01)

(52) U.S. Cl.
CPC ...... *G06F 11/0793* (2013.01); *G06F 11/0739* (2013.01); *G06Q 10/063* (2013.01)

(58) Field of Classification Search
CPC .................. G06F 11/0793; G06F 11/0739
USPC ....................................................... 701/31.6
See application file for complete search history.

(56) References Cited

U.S. PATENT DOCUMENTS

| | | | |
|---|---|---|---|
| 6,789,007 B2 * | 9/2004 | Ellis | G06Q 10/06 244/1 R |
| 7,545,274 B2 | 6/2009 | Coop | |
| 7,761,200 B2 | 7/2010 | Avery et al. | |
| 8,380,385 B2 | 2/2013 | Yukawa et al. | |
| 8,751,068 B2 | 6/2014 | Barraci et al. | |
| 9,218,694 B1 * | 12/2015 | Kipersztok | G07C 5/006 |
| 2002/0143444 A1 | 10/2002 | Sinex | |
| 2007/0112487 A1 | 5/2007 | Avery et al. | |
| 2009/0313505 A1 * | 12/2009 | McCroskey | G06F 11/006 714/37 |
| 2013/0151308 A1 | 6/2013 | Helms et al. | |

OTHER PUBLICATIONS

Extended European Search Report for Application No. 16174159.0, Oct. 7, 2016, 9 pages.

\* cited by examiner

*Primary Examiner* — Yazan Soofi
(74) *Attorney, Agent, or Firm* — Armstrong Teasdale LLP

(57) ABSTRACT

Methods and systems are provided for prioritizing a plurality of maintenance corrective actions in a troubleshooting chart for a device are provided. The method includes receiving, by a processor, an input from a user indicative of a successful corrective action from the plurality of corrective actions on the troubleshooting chart and incrementing a value of a counter associated with the successful corrective action. The processor then compares values for counters associated with each of the plurality of corrective actions and displays the plurality of corrective actions in hierarchal order based on the values of the counters.

20 Claims, 9 Drawing Sheets

METHODS AND SYSTEMS FOR PRIORITIZING REPLACEMENT OF AT LEAST ONE PART FOR VEHICLE FAULT ANALYSIS

BACKGROUND

The field of the disclosure relates generally to vehicle fault analysis, and more specifically, to methods and systems for prioritizing replacement of at least one part for vehicle fault analysis.

Troubleshooting an aircraft fault often involves a maintenance person of an airline removing one or more suspected parts from a functioning aircraft in hopes that one of the parts caused the fault. The parts are then sent to a supplier of the parts for testing and/or repair. Often times during testing, a part performs up to its specifications and has no fault found (NFF), and is sent back to the airline. NFF occurs when a potentially faulty part of an aircraft is removed and sent to a supplier to be tested, and the supplier determines that there is no fault associated with the particular part. A part may be returned as NFF because there is not actually a problem with the part, the part was not adequately tested, and/or another part of the aircraft caused the fault. Few NFF's are actually documented throughout the entire lifecycle of the NFF. For example, an airline may document the removal of a part being sent to a supplier, but the supplier may just return the part among many other parts without information regarding whether the part was returned with NFF. An In-service Data Program (ISDP) is designed to assist with NFF, but airlines and suppliers data must work in concert for the process to work correctly. The lack of tracking of parts removed for testing results in decreased efficiency and increased time and costs during the maintenance process.

BRIEF DESCRIPTION

In one implementation, a method of prioritizing replacement of at least one part for vehicle fault analysis is provided. The method includes determining, by a fault analysis module, that a fault is present in the vehicle; identifying a plurality of parts associated with the fault; determining at least one of a fixed effectiveness rate and a no fault found (NFF) rate for each part of the plurality of parts; and generating a list of the plurality of parts in hierarchal order based on the determined at least one of the fixed effectiveness rate and the NFF rate.

In another implementation, a fault analysis module for prioritizing replacement of at least one part for vehicle fault analysis is provided. The fault analysis module includes a memory for storing data and a processor in communication with the memory. The processor is programmed to determine that a fault is present in the vehicle; identify a plurality of parts associated with the fault; determine at least one of a fixed effectiveness rate and a no fault found (NFF) rate for each part of the plurality of parts; and generate a list of the plurality of parts in hierarchal order based on the determined at least one of the fixed effectiveness rate and the NFF rate.

DETAILED DESCRIPTION

Figure 1:
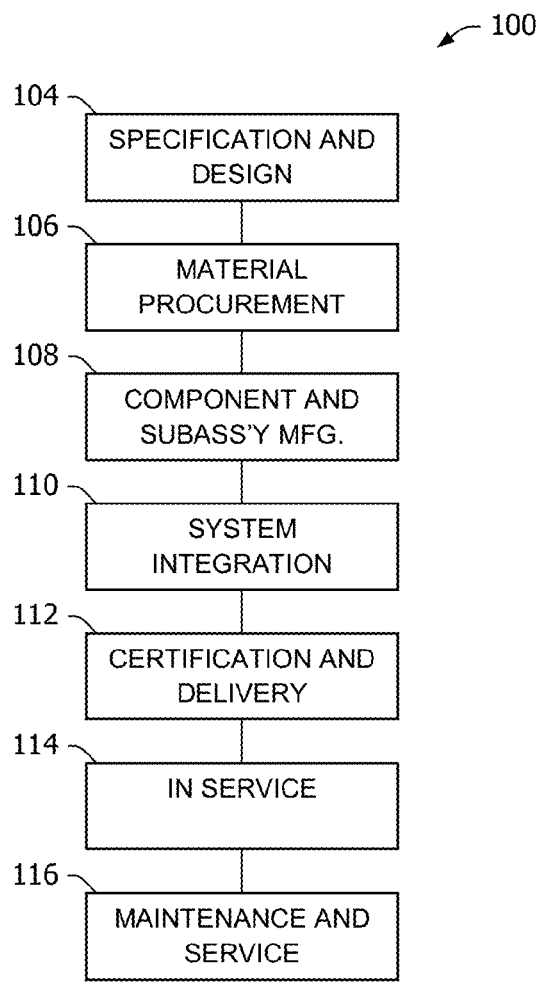
FIG. 1 is a flow diagram of an exemplary aircraft production and service methodology.
Figure 2:
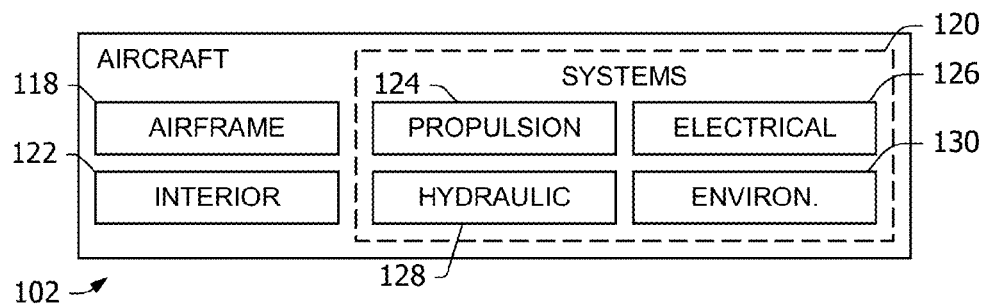
FIG. 2 is a block diagram of an exemplary aircraft.

Referring to the drawings, implementations of the disclosure may be described in the context of an aircraft manufacturing and service method 100 (shown in FIG. 1) and via an aircraft 102 (shown in FIG. 2). During pre-production, including specification and design 104 data of aircraft 102 may be used during the manufacturing process and other materials associated with the airframe may be procured 106. During production, component and subassembly manufacturing 108 and system integration 110 of the aircraft 102 occurs, prior to aircraft 102 entering its certification and delivery process 112. Upon successful satisfaction and completion of airframe certification, aircraft 102 may be placed in service 114. While in service by a customer, aircraft 102 is scheduled for periodic, routine, and scheduled maintenance and service 116, including any modification, reconfiguration, and/or refurbishment, for example.

Each portion and process associated with aircraft manufacturing and/or service 100 may be performed or completed by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, aircraft 102 produced via method 100 may include an airframe 118 having a plurality of systems 120 and an interior 122. Examples of high-level systems 120 include one or more of a propulsion system 124, an electrical system 126, a hydraulic system 126, and/or an environmental system 130. Any number of other systems may be included. Although an aircraft example is shown, the principles of the invention may be applied to non-aviation industries, such as the automotive industry and/or other service industries that employ troubleshooting methodologies.

The systems and methods embodied herein may be employed during any one or more of the stages of method 100. For example, components or subassemblies corresponding to component production process 108 may be fabricated or manufactured in a manner similar to components or subassemblies produced while aircraft 102 is in service. Also, one or more apparatus implementations, method implementations, or a combination thereof may be utilized during the production stages 108 and 110, for example, by substantially expediting assembly of, and/or reducing the cost of assembly of aircraft 102. Similarly, one or more of system implementations, method implementations, or a combination thereof may be utilized while aircraft 102 is being serviced or maintained, for example, during scheduled maintenance and service 116.

Figure 3:
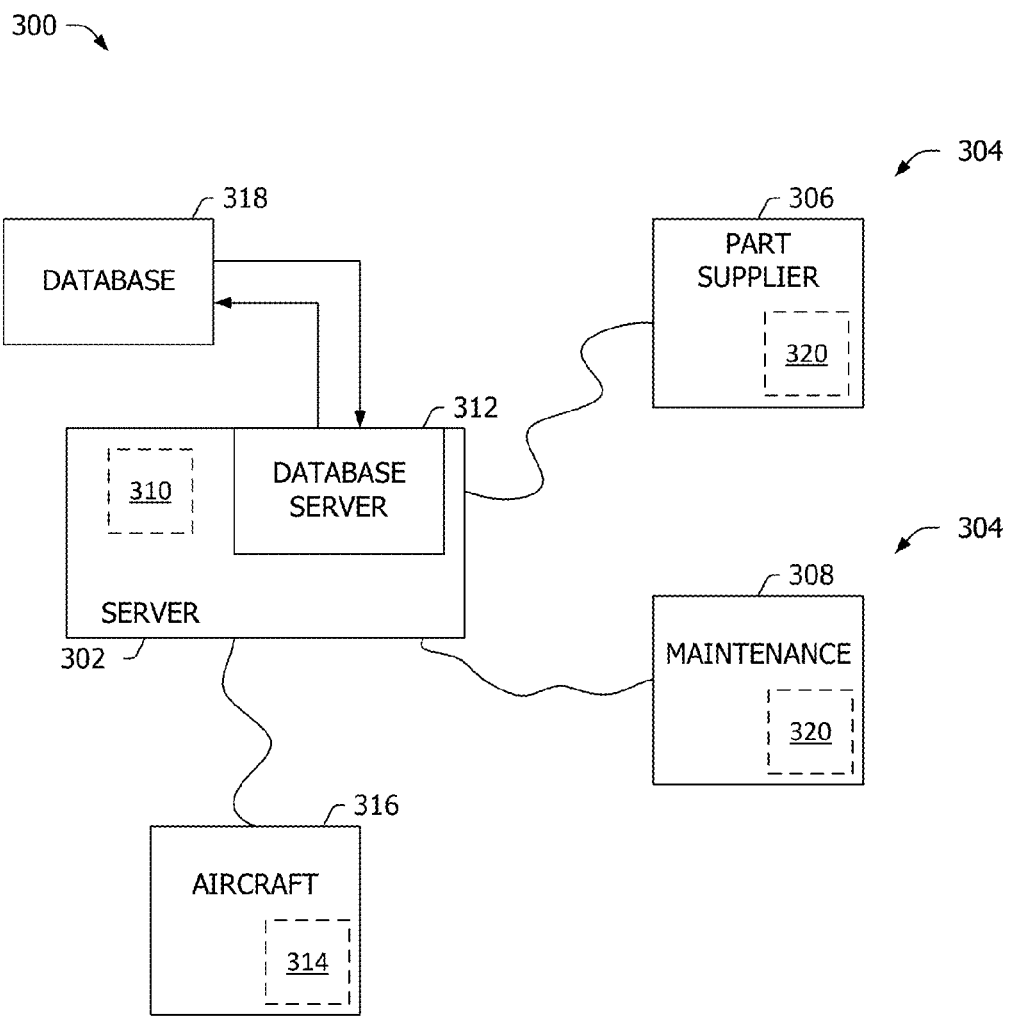
FIG. 3 is a diagram of an exemplary system for maintaining a troubleshooting chart.

FIG. 3 is a simplified block diagram of an exemplary system 300 for prioritizing replacement of at least one part for vehicle fault analysis. In the exemplary implementation, system 300 is used with a mobile platform, for example an aircraft, an airline operating the aircraft, and/or any other aviation entity within an aviation community such as other airlines or maintenance organizations. However, system 300 may also be used in any other application where it is desirable to prioritize part replacement during fault analysis and/or maintenance operations including the repair and/or maintenance of marine vessels, spacecraft, land vehicles, underwater vessels, and/or the maintenance of complex machinery or computer systems within a factory environment.

More specifically, in the exemplary implementation, system 300 includes a maintenance server system 302 and a plurality of client subsystems, also referred to as client computing devices 304, connected to maintenance server system 302. In one implementation, computing devices 304 are computers including a web browser, such that maintenance server system 302 is accessible to client computing devices 304 using the Internet. Client computing devices 304 are interconnected to the Internet through many interfaces including a network, such as a local area network (LAN) and/or a wide area network (WAN), dial-in connections, cable modems, wireless-connections, and special high-speed ISDN lines. Client computing devices 304 may be any device capable of interconnecting to the Internet including a web-based phone, personal digital assistant (PDA), or other web-connectable equipment. In the exemplary implementation, client computing devices 304 include a part supplier computing device 306 and a maintenance personnel computing device 308 (e.g., a smartphone, a tablet, or other computing device), and/or any other computing device capable of communicating with maintenance server system 302.

Maintenance server system 302 includes a fault analysis module 310 and a database server 312. Fault analysis module 310 is configured to track an aircraft part through the lifecycle of part removal and prioritize replacement of at least one part for vehicle fault analysis. Part supplier computing device 306 and/or maintenance personnel computing device 308 may input fault, repair, or maintenance information to fault analysis module 310. Fault analysis module 310 is also in communication with an on-board electronic logbook (ELB) system 314 of at least one aircraft 316 to receive fault analysis requests when ELB system 314 senses a fault in one or more components or systems of aircraft 316.

Database server 312 is coupled to a database 318, which contains information on a variety of matters, as described below in greater detail. In one implementation, centralized database 310 is stored on maintenance server system 302 and can be accessed by users using one of client computing devices 304 by logging onto maintenance server computing device 306. In an alternative implementation, database 310 is stored remotely from maintenance server computing device 306 and may be non-centralized. Database 310 may store NFF rate information, fixed effectiveness information, fault information, repair information, maintenance information, fault isolation manuals, and/or airplane maintenance manuals. Maintenance information for an aircraft part is stored in database 318 through the creation of maintenance records. A specific maintenance record, for example, may include information concerning a specific fault that was encountered by a maintenance person, a specific fault object (e.g., a particular sensor, valve, etc.) existing on aircraft 316, a specific condition of the object found (or believed) to be at fault, a specific location of the object, a date on which the repair action was performed, and the name of the maintenance individual that created the record. The maintenance record may also include a part identifier associated with the removed part, an indication whether removal of the part was successful, and test results determined by a part supplier. The fault may be assigned a specific fault code (e.g., a number or alphanumeric) that represents the fault and enables the maintenance record to be cataloged in, and retrieved quickly from, database 318. Similarly, the maintenance record may include information on a part that has been replaced as well as any specific tasks performed as part of a maintenance action (e.g., recalibration or alignment of a subsystem after installing the new part).

In the exemplary implementation, part supplier computing device 306 and maintenance personnel computing device 308 each include a maintenance application 320. Maintenance application 320 is configured to provide an interface between maintenance server system 302 and at least one of a part supplier and a mechanic so that NFF information, fault history, repair history, and fixed effectiveness information may be communicated to maintenance server system 302.

Fault analysis module 310 provides part tracking of a part throughout the entire part removal lifecycle, which includes: Removal, Supplier, Fix, Inventory, and Installation. By tracking which parts are removed and replaced in response to a fault, whether the replacement was successful, and tracking a rate that the part is found by a supplier to have NFF for that fault, a database is continuously compiled that can prioritize replacement of a part having the highest probability of being the cause of a particular fault. In the exemplary implementation, the prioritization process is a Bayesian statistic methodology whereby prior probability information (of the part removal) along with a likelihood of the model given the data of the removal are joined mathematically to create a Posterior probability of the most likely part removal given the specific data. The Posterior probability is what is continuously updated. Alternatively, any other prioritization process may be used that enables fault analysis module 310 to function as described herein.

Figure 4:
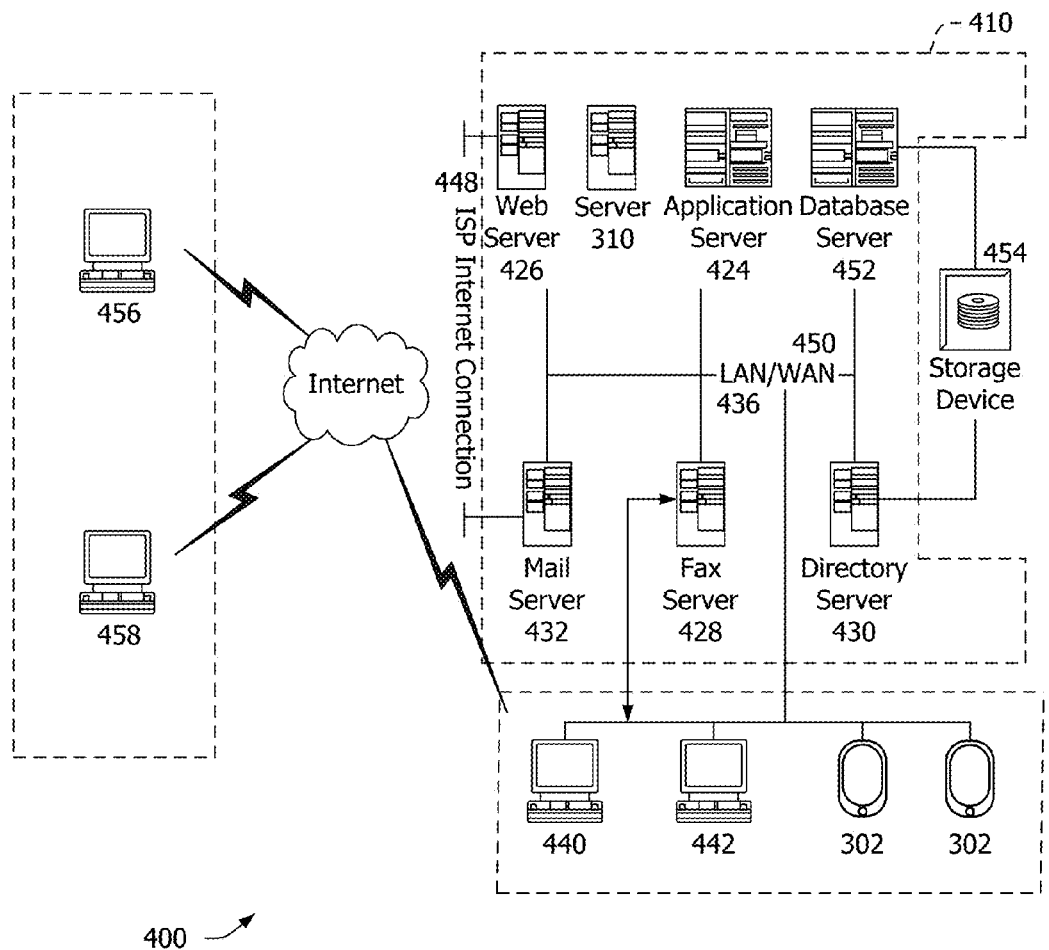
FIG. 4 is an expanded block diagram of a server architecture of a computer system.

FIG. 4 is an expanded block diagram of a server architecture of a computer system 400. System 300, or at least the functionality of system 300 as described above, may be included within system 400. Components in system 400, identical to components of system 300 (shown in FIG. 3), are identified in FIG. 4 using the same reference numerals used in FIG. 3.

Referring specifically to FIG. 4, system 400 includes server group 410 and client computing devices 304. Server group 410 includes a database server 452, an application server 424, a web server 426, a fax server 428, a directory server 430, a mail server 432, and maintenance server system 302. A disk storage unit containing database 454 is coupled to database server 452 and directory server 430. Servers 424, 426, 428, 430, 432, and 450 are communicatively coupled in a local area network (LAN) 436. In addition, client computing devices 440 and 442, and client computing devices 304 are coupled to LAN 436. Alternatively, client computing devices 440 and 442, and client computing devices 304 are coupled to LAN 436 using an Internet link or are connected through an intranet. Each mobile computing device, 440 and 442, is a computing device having a troubleshooting application.

Server group 410 is configured to be communicatively coupled to entities outside LAN 436 as well, such as computing devices 456 and 458 using an Internet connection 448. Any other wide area network (WAN) type communication can be utilized in other implementations. In addition, and rather than WAN 450, local area network 436 could be used in place of WAN 450.

In some implementations, any authorized individual or entity having a workstation computing device 440, 442, 456, 458 may access system 400. At least one of the computer systems includes a manager workstation computing device 456 located at a remote location. Workstation computing devices 456 and 458 are configured to communicate with server group 410. Server computing device 306, which is in communication with client computing devices 304, receives and transmits information to and from client computing devices 304, as well as computing devices 440 and 442. It should be understood that any number of mobile computing devices may be included in the systems of FIGS. 3 and 4.

References herein to client computing device 304 initiating or executing application software, for example troubleshooting software, should be interpreted to mean that, in some implementations, the application software is stored entirely in the memory of and executed exclusively by a processor in client computing device 304, whereas in other implementations, the application software has a client-server architecture. In implementations where the application software has a client-server architecture, client computing device 304 executes a client component of the application software, for example in a web browser, and one or more servers, for example web server 426, executes a server component of the application software.

Figure 5:
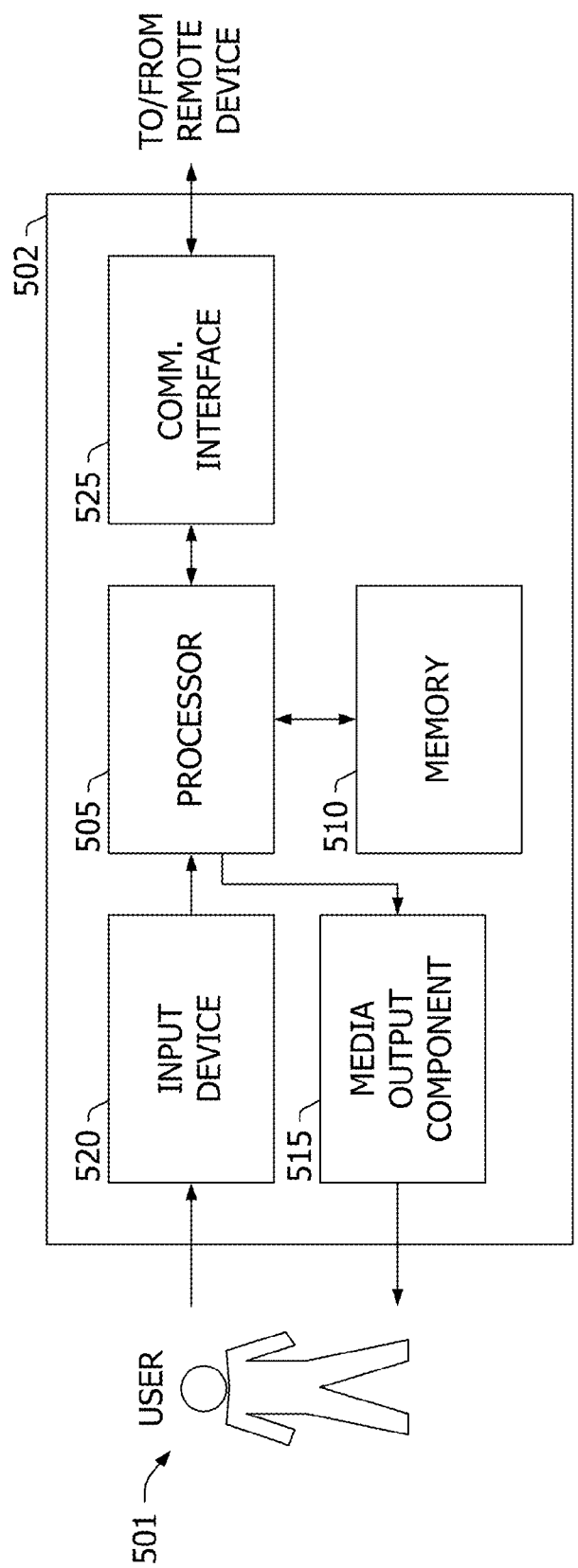
FIG. 5 illustrates an exemplary configuration of a mobile computing device.

FIG. 5 illustrates an example configuration of a computing device 502. Computing device 502 is representative of any of client computing devices 304, maintenance server system 302, and servers 424, 426, 428, 430, 432, and 452 of server group 410, and computing devices 440, 442, 456, and 458 as shown in FIGS. 3 and 4. Referring specifically to FIG. 5, computing device 502 includes a processor 505 for executing instructions. In some implementations, executable instructions are stored in a memory 510. Processor 505 includes one or more processing units (e.g., in a multi-core configuration). Memory 510 is any device allowing information such as executable instructions and/or data to be stored and retrieved. Memory 510 may include one or more computer readable storage devices or other computer readable media, including transitory and non-transitory computer readable media.

Computing device 502 also includes at least one media output component 515 for presenting information to user 501. Media output component 515 is any component capable of conveying information to user 501. In some implementations, media output component 515 includes an output adapter such as a video adapter and/or an audio adapter. An output adapter is operatively coupled to processor 505 and is operatively couplable to an output device such as a display device (e.g., a liquid crystal display (LCD), organic light emitting diode (OLED) display, cathode ray tube (CRT), or "electronic ink" display) or an audio output device (e.g., a speaker or headphones). In some implementations, at least one such display device and/or audio device is included in media output component 515.

In some implementations, computing device 502 includes an input device 520 for receiving input from user 501. Input device 520 may include, for example, a keyboard, a keypad, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 515 and input device 520.

Still referring to FIG. 5, computing device 502 may also include a communication interface 525, which is communicatively couplable to a remote computing device such as any servers of server group 410. Communication interface 525 includes, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory 510 are, for example, processor-executable instructions for providing a user interface to user 501 via media output component 515 and, optionally, receiving and processing input from input device 520. Memory 510 includes, but is not limited to, any computer-operated hardware suitable for storing and/or retrieving computer-executable instructions and/or data. Memory 510 may include random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). Further, memory 510 may include multiple storage units such as hard disks or solid state disks in a redundant array of inexpensive disks (RAID) configuration. Memory 510 may include a storage area network (SAN) and/or a network attached storage (NAS) system. In some implementations, memory area 510 includes memory that is integrated in mobile computing device 502. For example, computing device 502 may include one or more hard disk drives as memory 510. Memory 510 may also include memory that is external to computing device 502 and may be accessed by a plurality of computing devices 502. The above memory types are exemplary only, and are thus not limiting as to the types of memory usable for storage of processor-executable instructions and/or data.

Figure 6:
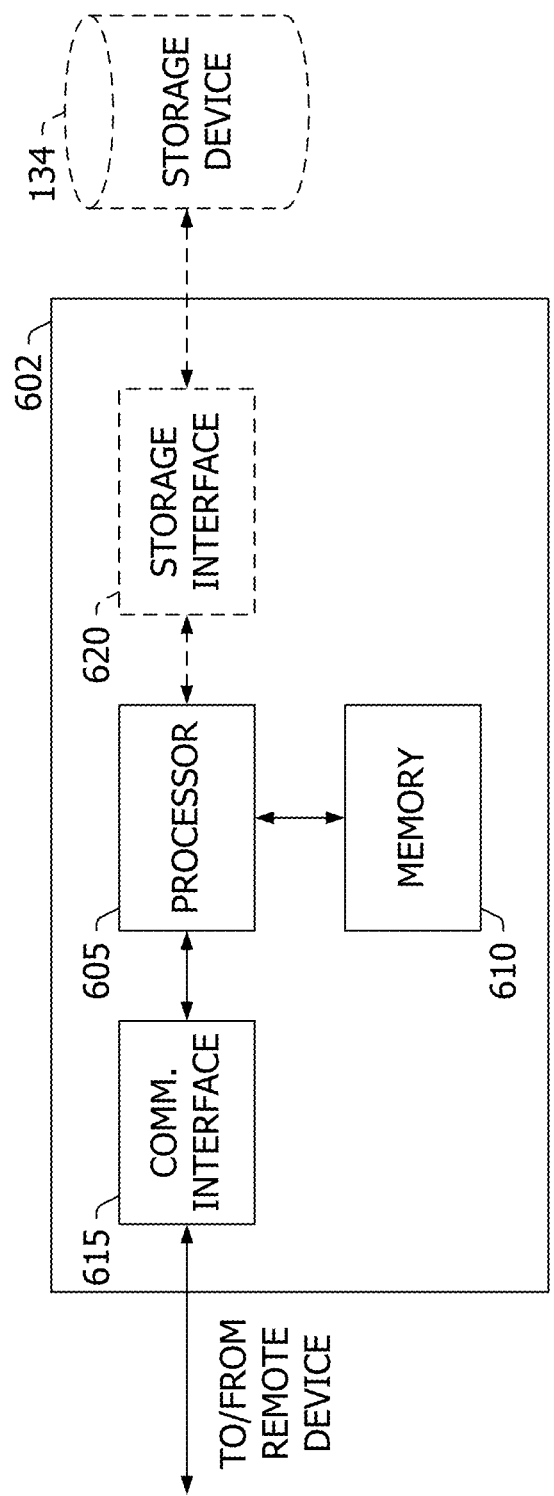
FIG. 6 illustrates an exemplary configuration of the maintenance server system shown in FIGS. 3 and 4.

FIG. 6 illustrates an exemplary configuration of a server system 602 such as maintenance server system 302 (shown in FIGS. 3 and 4). Server system 602 may include, but is not limited to, database server 312, application server 424, web server 426, fax server 428, directory server 430, and mail server 432.

Server system 602 includes a processor 605 for executing instructions. Instructions may be stored in a memory area 610, for example. Processor 605 may include one or more processing units (e.g., in a multi-core configuration) for executing instructions. The instructions may be executed within a variety of different operating systems on server system 602, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 605 is operatively coupled to a communication interface 615 such that server system 602 is capable of communicating with a remote device such as a user system or another server system 602. For example, communication interface 615 may receive requests from client computing device 304 via the Internet, as illustrated in FIGS. 3 and 4.

Processor 605 may also be operatively coupled to a storage device 134. Storage device 134 is any computer-operated hardware suitable for storing and/or retrieving data. In some embodiments, storage device 134 is integrated in server system 602. For example, server system 602 may include one or more hard disk drives as storage device 134. In other embodiments, storage device 134 is external to server system 602 and may be accessed by a plurality of server systems 602. For example, storage device 134 may include multiple storage units such as hard disk drives or solid state drives in a redundant array of independent disks (RAID) configuration. Storage device 134 may include a storage area network (SAN) and/or a network attached storage (NAS) system.

In some embodiments, processor 605 is operatively coupled to storage device 134 via a storage interface 620. Storage interface 620 is any component capable of providing processor 605 with access to storage device 134. Storage interface 620 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 605 with access to storage device 134.

Memory area 610 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 7:
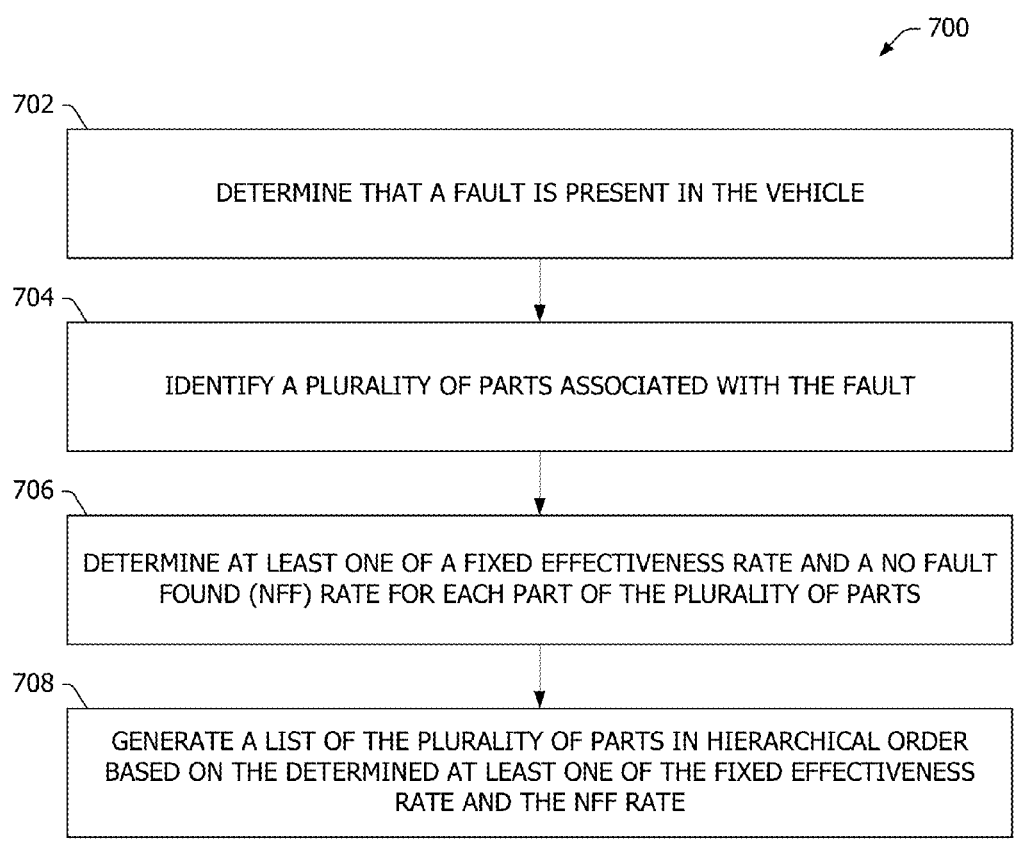
FIG. 7 is a flowchart of an exemplary method 700 of prioritizing replacement of at least one part for vehicle fault analysis.
Figure 8:
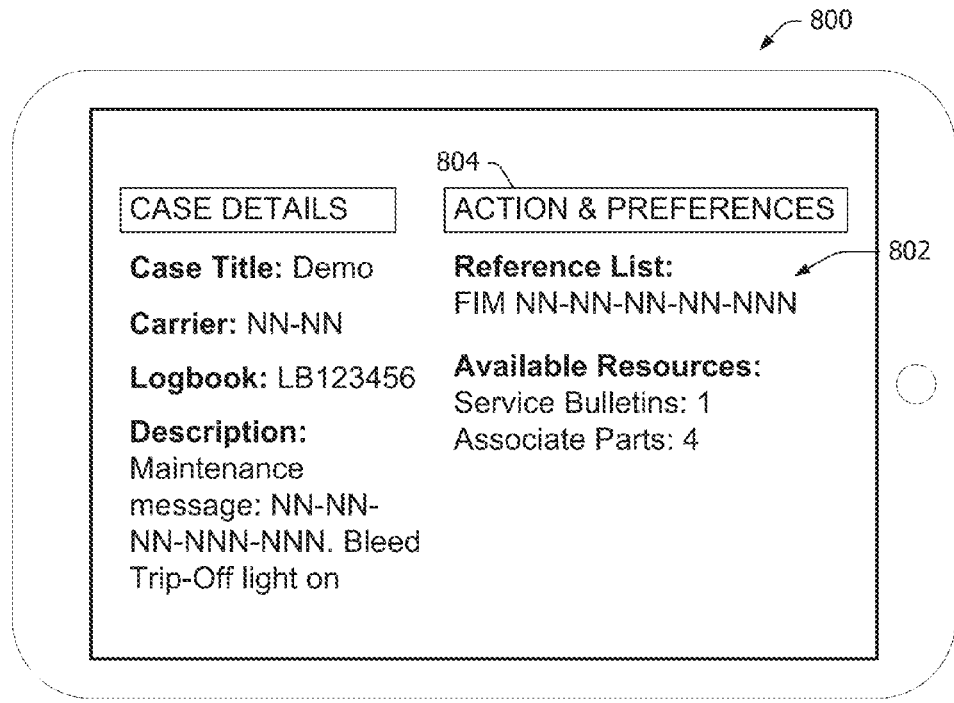
FIG. 8 is an exemplary screenshot of a case that the fault analysis module (shown in FIG. 3) displays to a user.

FIG. 7 is a flowchart of an exemplary method 700 of prioritizing part replacement for vehicle fault analysis. FIG. 8 is an exemplary screenshot 800 of a case that is displayed by fault analysis module 310 to a user. Referring to FIGS. 7 and 8, in the exemplary implementation, aircraft 316 senses a fault in at least one on-board component or system and transmits a fault message to fault analysis module 310 of maintenance server system 302. Fault analysis module 310 determines 702 that a fault is present in the vehicle by communicating with ELB system 314 and compiles case details associated with the fault. The case details may include, but are not limited to, a fault code associated with the fault, a case title, a number of an electronic logbook that reported the fault, a description of the fault, a reference list including references available to analyze the fault, and any other available resources. Based on the type of fault, fault analysis module 310 then correlates a Fault Isolation Manual (FIM) number 802 to the case details. A specific FIM number 802 is associated with each particular fault that may occur in aircraft 316. FIM number 802 directs a user to a FIM section that details steps for troubleshooting the fault.

A maintenance person accesses the case using maintenance application 320 on maintenance personnel computing device 308. In some implementations, fault analysis module 310 transmits a message to maintenance application 320 that a case is available. The message may include at least one of a push notification, a text message, an email, and a phone call. After accessing the case, the maintenance person selects an "Action and References" option 804 on maintenance personnel computing device 308. Fault analysis module 310 receives the selection of Action and References option 804 and displays the appropriate FIM section for the maintenance person to reference when analyzing the fault.

Figure 9:
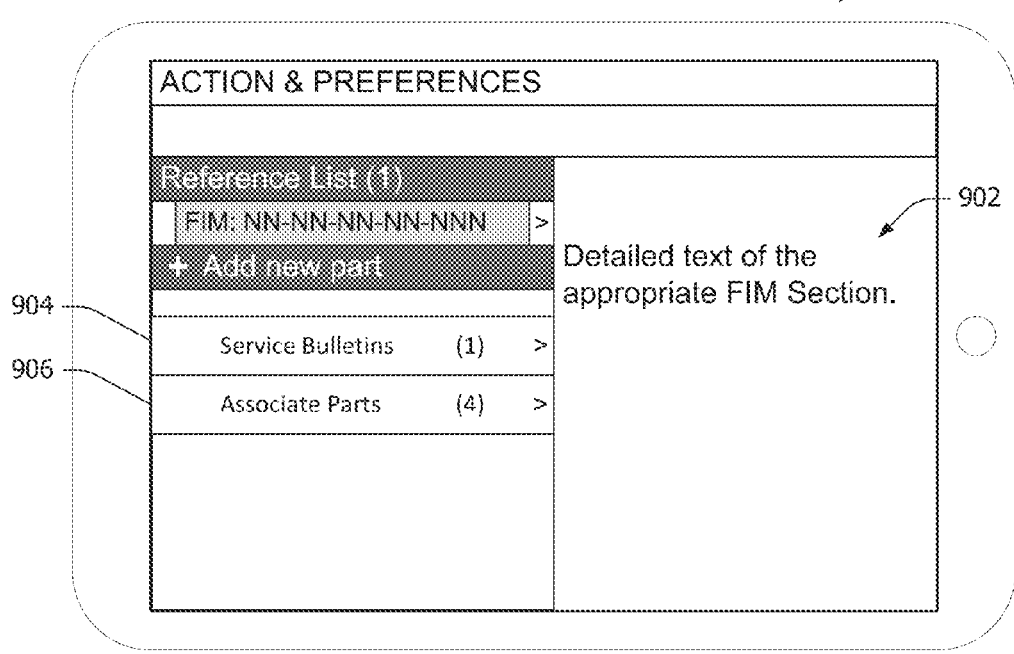
FIG. 9 is an exemplary screenshot of a FIM section displayed by the fault analysis module (shown in FIG. 3) upon selection of the Action and References option (shown in FIG. 8).

FIG. 9 is an exemplary screenshot 900 of a FIM section 902 displayed by fault analysis module 310 upon selection of Action and References option 804. In the exemplary implementation, upon receiving Action and References option 804 selection, fault analysis module 310 displays the appropriate FIM section 902 to be referenced when analyzing the fault. In addition, fault analysis module 310 also provides a "Service Bulletins" option 904 associated with the FIM number and an "Associated Parts" option 906. Service Bulletins option 904 notifies the maintenance person of the latest industry part trends. For example, Service Bulletins option 904 may indicate that for a particular FIM number, a certain part is failing at a higher rate than expected and accordingly, the specific part may have an increased likelihood of causing the fault. This provides the maintenance person an indication of where to start when addressing the fault.

Figure 10:
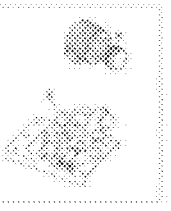
FIG. 10 is an exemplary screenshot of an Associated Parts option generated and displayed by the fault analysis module (shown in FIG. 3).

FIG. 10 is an exemplary screenshot 1000 of Associated Parts option 906 generated and displayed by fault analysis module 310. Referring now to FIGS. 7 and 10, in the exemplary implementation, fault analysis module 310 identifies 704 a plurality of parts associated with the fault that could be responsible for causing the fault. Associated Parts option 906 enables the maintenance person to view parts associated with the particular FIM number 802. That is, for a particular fault, there are numerous parts on aircraft 316 that may cause one particular fault. In the exemplary implementation, fault analysis module 310 determines 706 a "fixed effectiveness" rate and/or a "no fault found" rate for each part of the plurality of associated parts. The fixed effectiveness rate is determined using data of the removal to create a Posterior probability of the most likely part removal given the specific data. The NFF rate indicates how often a part number is sent to a supplier for testing and the supplier finds no faults in the part.

Fault analysis module 310 then generates 708 a list of the plurality of parts in hierarchical order based at least in part on the determined fixed effectiveness rate and/or NFF rate. By sorting the associated parts by fixed effectiveness rate, fault analysis module 310 effectively provides a recommendation to the maintenance person regarding which part to replace based on the particular fault. For example, a high stage regulator is at the top of Associated Parts list because fault analysis module 310 determined, based on historical replacement information, that replacing the high stage regulator has fixed the fault at a success rate of 93%. A bleed air valve is at the bottom of the Associated Parts list because replacing the bleed air valve has been successful only 63% of the time. By displaying the associated parts based on their fixed effectiveness rate, there is an increased probability that the maintenance person will identify and remove the part actually causing the fault. During the primary stages of use of fault analysis module 310, the fault effectiveness rates may not be very accurate. However, as the number of part replacements increases over time, the fixed effectiveness rates for the parts become increasingly accurate.

Both the fixed effectiveness rate and the NFF rate are displayed concurrently; however, the fixed effectiveness rate is the primary sorting parameter. Accordingly, the list is displayed in hierarchal order based on the fixed effectiveness rate. If the probability of the correct part goes UP, then the NFF rate goes DOWN, and vice versa.

In the exemplary implementation, Associated Parts option 906 may also display other additional information that enables the maintenance person to make a more informed decision. Additional information may include, but is not limited to, Time since Installed (TSI), Cycles since Installed (CSI), Time since Overhauled (TSO), Mean Time between Failure (MTBF), Mean Time between Unscheduled Removal (MTBUR), whether the part is in stock, and whether the part is under warranty. Different aspects and/or combinations of the additional information assist the maintenance person in determining which part to remove. Further, if the part has a high fixed effectiveness rating and/or a low NFF rate, then there is an increased likelihood that it may be failing and might be a good part to remove. Additionally, the part is a good part to remove if there is a backup part in-stock and/or under warranty. In the exemplary implementation, the maintenance person should select the high stage regulator for removal because of the aforementioned factors. Additionally, or alternatively, if the maintenance personnel notices a high fix effectiveness but a low TSI in hours; maintenance planning should be contacted and an infant mortality (early failures in the part life cycle) investigation would be warranted. If the maintenance personnel notices the same part (serial number), maintenance planning should be contacted because a possible rouge part is suspected. Then NFF part protocols could be implemented.

Figure 11:
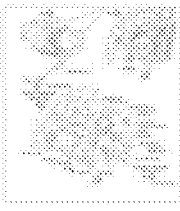
FIG. 11 is an exemplary screenshot of a Part Information option generated and displayed by the fault analysis module (shown in FIG. 3) when a particular part is selected for removal.

FIG. 11 is an exemplary screenshot 1100 of a Part Information option 1102 generated and displayed by fault analysis module 310 when a particular part is selected for removal. In the exemplary implementation, Part Information option 1102 displays the specific part details provided in Associated Parts option 906, but only for the selected part. Part Information option 1102 also displays supplier information for the part and part illustrations retrieved from an Illustrated Parts Catalog stored on database 318. Additionally, upon selection of the part, an airplane maintenance manual (AMM) reference number 1104 for the part is automatically displayed by fault analysis module 310.

Figure 12:
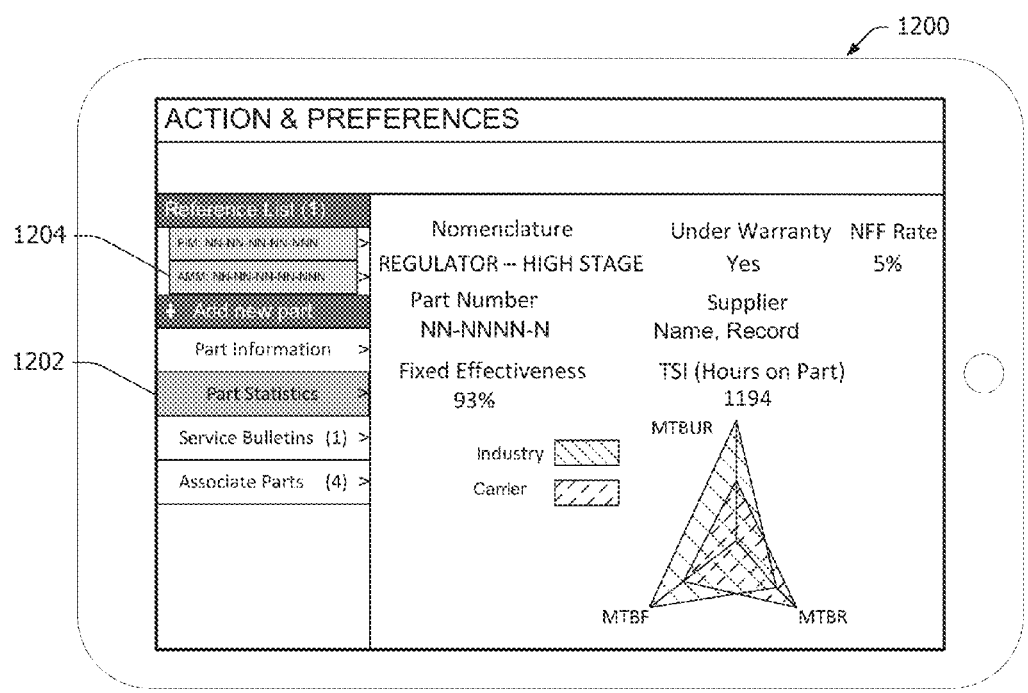
FIG. 12 is an exemplary screenshot of a Part Statistics option generated and displayed by the fault analysis module (shown in FIG. 3) when a particular part is selected for removal.

FIG. 12 is an exemplary screenshot 1200 of a Part Statistics option 1202 generated and displayed by fault analysis module 310 when a particular part is selected for removal. In the exemplary implementation, the maintenance person may also select Part Statistics option 1202 to view detailed part information in combination with certain part statistics. In the exemplary implementation, part statistics include, but are not limited to, TSI, MTBF, and MTBUR. Under the Part Statistics option 1202, fault analysis module 310 displays a graphical relationship between the various part statistics. Additionally, AMM reference number 1104 for the part is automatically displayed by fault analysis module 310.

Based on all of the information provided by fault analysis module 310 for the fault, the maintenance person replaces a part recommended for removal to improve maintenance efficiency. The maintenance person then documents the replacement by inputting information into a maintenance record provided via maintenance application 320. More specifically, in the exemplary implementation, documenting the replacement includes inputting specific tasks performed and/or specific part numbers of parts removed and replaced based on the prioritized list of parts generated by fault analysis module 310 into a maintenance record provided via maintenance application 320 on maintenance personnel computing device 308. All relevant part information is documented for shipment to the supplier for correct Root Cause corrective action (RCCA). This is how database 318 accurately links-up a part removal with a shop tear down report, which determines root cause or NFF.

In the exemplary implementation, the maintenance record also includes a replacement success indicator input by the maintenance person that indicates whether removing and replacing the part recommended by fault analysis module 310 successfully fixed the fault. The replacement success indicator is extracted by fault analysis module 310 and is used in determining and/or updating the fixed effectiveness rate associated with the part number. For each removable part number on aircraft 316, fault analysis module 310 maintains two counters in database 318: a first fixed effectiveness counter that tracks a number of times the part number has been replaced for the particular fault, and a second fixed effectiveness counter that tracks a number of times that the replacement success indicator indicated that the replacement part successfully fixed the fault. Accordingly, each time fault analysis module 310 extracts a replacement success indicator for a part number from a maintenance record, it increments the first fixed effectiveness counter to increase the number of times the part number has been replaced for the fault by a value of one. If the extracted replacement success indicator indicates that the replacement part fixed the fault, then fault analysis module 310 also increments the second fixed effectiveness counter to increase the number of times the replacement part successfully fixed the fault by a value of one.

In the exemplary implementation, to determine the fixed effectiveness rate for the part number, fault analysis module 310 calculates a ratio between the second fixed effectiveness counter and the first fixed effectiveness counter. More specifically, fault analysis module 310 calculates a ratio between the number of times that the replacement part successfully fixed the fault and the number of times the part number has been replaced for the particular fault. The Posterior or Fixed Effectiveness Rate or the probability of a fault given the data/(airplane messages) equals the probability of the airplane data given a fault (times) the probability of a airplane fault; all divided by the probability of the airplane data., and is represented by the equation: P(Fault|Data)=(P(Data|Fault)*P(Fault))/P(Data).

In the exemplary implementation, during the documenting of the replacement in the maintenance record, the maintenance person assigns a unique part identifier the removed part. The part identifier is physically coupled or attached to the removed part and is also documented in the maintenance record. The part identifier enables a linking to be formed between the physical part, the detailed fault information for the part input by the maintenance person, and information input by other entities, such as the part supplier, as described in more detail below. Upon completion of the maintenance record, the maintenance person uses maintenance personnel computing device 308 to transmit the maintenance record to fault analysis module 310. Fault analysis module 310 receives the maintenance record including the unique part identifier associated with the removed part, and stores it on database 318.

The part is then shipped to a part supplier for testing to determine whether it was the cause of the fault. The part supplier tests the part and determines either that the part is faulty or that there is NFF for the part. After determining the test results, the part supplier accesses maintenance application 320 using part supplier computing device 306 and inputs the unique part identifier provided on the part to view the maintenance record. Fault analysis module 310 receives the unique part identifier input by the part supplier using part supplier computing device 306. Fault analysis module 310 retrieves the maintenance record for the removed part using the unique part identifier and displays it to the part supplier. The supplier inputs the test results into the maintenance record. If the part was determined as being faulty, the supplier repairs the part and notes it in the maintenance record. Alternatively, if testing reveals that the part is not faulty, then the supplier records a NFF status in the maintenance record. The part supplier then transmits the updated maintenance record to fault analysis module 310 using part supplier computing device 306. Fault analysis module 310 receives the test results for the removed part input by the part supplier and stores the updated maintenance record including the test results in database 318.

In the exemplary implementation, fault analysis module 310 extracts the test results input by the supplier to update the NFF rate for the part number. For each removable part number on aircraft 316, fault analysis module 310 maintains two counters in database 318: a first NFF counter that tracks a number of times the part number has been tested by a part supplier, and a second NFF counter that tracks a number of times that the part supplier has indicated NFF for the part number. Accordingly, each time fault analysis module 310 extracts supplier test results for a part number from a maintenance record, it increments the first NFF counter to increase the number of times the part number has been tested by a value of one. If the test results indicate that there is NFF, then fault analysis module 310 also increments the second NFF counter to increase the number of times the part had NFF by a value of one.

In the exemplary implementation, to determine the NFF rate for the part number, fault analysis module 310 calculates a ratio between the second NFF counter and the first NFF counter. More specifically, fault analysis module 310 calculates a ratio between the number of times that the part number had NFF and the number of times the part number has been tested. The updated NFF rate associated with the part is stored on database 318.

As opposed to the fixed effectiveness rate where a high percentage is desirable, a low NFF rate for a part number is desirable because it indicates that most of the times that the part number is sent to the supplier for testing, a fault is found for the part number. Accordingly, if the fixed effectiveness rates are similar for two or more associated parts, the maintenance person may be advised by the NFF rates to remove a part that has the greatest likelihood of being determined faulty by the part supplier. Maintaining a low NFF rate for a part number indicates that the part is only being removed and sent to the supplier for testing when it is very likely that the part is the cause of the fault. The low NFF rate improves all-around efficiency of an airline in that an amount of time the aircraft is grounded to remove and replace parts is reduced and the time and costs associated with shipping removed parts to and from the supplier are reduced.

An exemplary technical effect of the methods and systems described herein includes at least one of: (a) determining, by a fault analysis module, that a fault is present in the vehicle; (b) identifying, by a fault analysis module, a plurality of parts associated with a fault; (c) determining, by the fault analysis module, at least one of a fixed effectiveness rate and a no fault found (NFF) rate for each part of the plurality of parts; and (d) generating, by the fault analysis module, a list of the plurality of parts in hierarchal order based on the determined at least one of the fixed effectiveness rate and the NFF rate.

The systems and methods described herein enable prioritizing replacement of at least one part for vehicle fault analysis. The fault analysis module 310 accumulates data relating to specific faults in a vehicle and the associated parts that are potentially responsible for those faults. By using the data to predict which part of a vehicle is most likely to cause each particular fault, the fault analysis module enables a maintenance person to make a more accurate and fully informed decision on which type of repair action to perform first when attempting to remedy a fault.

The fault analysis module also provides recommendations for which part to replace in response to a specific fault. The recommendations become more accurate as more repair and fault information is collected. In effect, "knowledge" or "learning" of the fault analysis module increases over time as more repair/fault information is collected, and thus the fault analysis module is able to provide more accurate and useful recommendations to each user as time goes on.

Moreover, the fault analysis module enables tracking of part information from the time the part is removed from an aircraft all the way to the supplier where it is tested for operability. By linking all of this information together, the fault analysis module determines fixed effectiveness rates, NFF rates, and highlights trends in vehicle parts for each specific fault. Using the determined fixed effectiveness and NFF rates, the fault analysis module reduces the time it takes to determine a root cause of a fault, which leads to faster corrective actions being applied and reduces the time in which an aircraft is out-of-service.

Implementations of the systems and methods described herein may embrace one or more computer-readable media, wherein each medium may be configured to include or includes thereon data or computer-executable instructions for manipulating data. The computer-executable instructions include data structures, objects, programs, routines, or other program modules that may be accessed by a processing system, such as one associated with a general-purpose computer capable of performing various different functions or one associated with a special-purpose computer capable of performing a limited number of functions. Computer-executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer-readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

The methods described herein may be encoded as executable instructions embodied in a computer readable medium, including, without limitation, a storage device or a memory of a computing device. Such instructions, when executed by one or more processors, cause the processor(s) to perform at least a portion of the methods described herein. As used herein, a "storage device" is a tangible article, such as a hard drive, a solid state memory device, and/or an optical disk that is operable to store data, such as computer-executable instructions.

The description of the different advantageous implementations has been presented for purposes of illustration and description, and is not intended to be exhaustive or limited to the implementations in the form disclosed. Many modifications and variations will be apparent to those of ordinary skill in the art. Further, different advantageous implementations may provide different advantages as compared to other advantageous implementations. The implementation or implementations selected are chosen and described in order to best explain the principles of the implementations, the practical application, and to enable others of ordinary skill in the art to understand the disclosure for various implementations with various modifications as are suited to the particular use contemplated.

This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of prioritizing replacement of at least one part for vehicle fault analysis, said method performed by a fault analysis module that includes a processor in communication with a memory device, said method comprising:
receiving, by the processor, an electronic fault signal from an electronic logbook on-board a vehicle, the electronic fault signal including a fault code indicating that a fault is present in a component of the vehicle;
processing the electronic fault signal to determine the fault code;
identifying, by the processor, a plurality of potentially faulty parts for the component associated with the electronic fault signal based on the determined fault code;
determining, by the processor, at least one of a fixed effectiveness rate and a no fault found (NFF) rate for each part of the plurality of potentially faulty parts based on historical part replacement data for each part stored on the memory device; and
generating, by the processor, a recommendation of which part of the plurality of potentially faulty parts to replace in response to the fault, the recommendation based on the determined at least one of the fixed effectiveness rate and the NFF rate for each part and the historical part replacement data, the recommendation including a display of a list of the plurality of potentially faulty parts in hierarchal order based on the determined at least one of the fixed effectiveness rate and the NFF rate.

2. The method of claim 1, further comprising:
compiling case details associated with the fault, the case details including at least one of a fault code associated with the fault, a case title, an identifier of an electronic logbook that reported the fault, a description of the fault, and a reference list including references available to analyze the fault; and
correlating a Fault Isolation Manual (FIM) number with the case details.

3. The method of claim 2, further comprising displaying a FIM section that provides detailed steps for troubleshooting the fault when a maintenance person selects the FIM number in a maintenance application in communication with the fault analysis module.

4. The method of claim 1, further comprising displaying service bulletins for the plurality of parts when a maintenance person selects a service bulletins option in a maintenance application in communication with the fault analysis module, the service bulletin including information regarding recent industry part trends.

5. The method of claim 1, wherein generating the recommendation further comprises displaying, for each part of the plurality of parts, at least one of Time Spent to Install (TSI), Mean Time between Failure (MTBF), Mean Time between Nonscheduled Removal (MTBNR), whether the part is in stock, and whether the part is under warranty.

6. The method of claim 1, further comprising:
receiving, from a maintenance person, a selection of a part to be removed, the selection being input by the maintenance person in a maintenance application in communication with the fault analysis module; and
displaying at least one of specific part details for the selected part, supplier information associated with a supplier of the part, part illustrations retrieved from an illustrated parts catalog, and detailed part statistics.

7. The method of claim 1, further comprising receiving a maintenance record that includes a part number of a part removed from the vehicle based on the list of the plurality of parts generated by the fault analysis module, the maintenance record received from the maintenance person using a maintenance personnel computing device.

8. The method of claim 7, wherein determining the fixed effectiveness rate comprises:
extracting a replacement success indicator from the maintenance record, the replacement success indicator indicating whether a replacement part installed on the vehicle successfully fixed the fault;
upon extracting the replacement success indicator, incrementing a first fixed effectiveness counter to increase a number of times the part number has been replaced for the fault;
when the extracted replacement success indicator indicates that the replacement part fixed the fault, incrementing a second fixed effectiveness counter to increase a number of times the replacement part successfully fixed the fault; and
calculating a ratio between the second fixed effectiveness counter and the first fixed effectiveness counter.

9. The method of claim 7, wherein determining the NFF rate comprises:
extracting test results from the maintenance record, the test results indicating whether a supplier determined the removed part caused the fault or the removed part had NFF;
upon extracting the test results, incrementing a first NFF counter to increase a number of times the part number has been tested;
when the extracted test results indicate NFF for the removed part, incrementing a second NFF counter to increase a number of times the part number had NFF; and
calculating a ratio between the second NFF counter and the first NFF counter.

10. The method of claim 7, wherein receiving the maintenance record further comprises:
receiving the maintenance record including a unique part identifier associated with the removed part; and
storing the maintenance record in a database.

11. The method of claim 10, wherein the removed part is sent to a part supplier for testing, said method further comprising:
receiving the unique part identifier input by the part supplier using a part supplier computing device;
retrieving the maintenance record for the removed part using the unique part identifier;
displaying the maintenance record to the part supplier;
receiving test results for the removed part input by the part supplier; and
storing the maintenance record including the test results in the database.

12. A fault analysis module for prioritizing replacement of at least one part for vehicle fault analysis, said fault analysis module comprising:
a memory for storing data; and
a processor in communication with said memory, said processor programmed to:
receive an electronic fault signal from an electronic logbook on-board a vehicle, the fault signal including a fault code indicating that a fault is present in a component of the vehicle;
process the electronic fault signal to determine the fault code;
identify a plurality of potentially faulty parts for the component associated with the electronic fault signal based on the determined fault code;
determine at least one of a fixed effectiveness rate and a no fault found (NFF) rate for each part of the plurality of potentially faulty parts based on historical part replacement data for each part stored on said memory; and
generate a recommendation of which part of the plurality of potentially faulty parts to replace in response to the fault, the recommendation based on the determined at least one of the fixed effectiveness rate and the NFF rate for each part and the historical part replacement data, the recommendation including a display of a list of the plurality of potentially faulty parts in hierarchal order based on the determined at least one of the fixed effectiveness rate and the NFF rate.

13. The fault analysis module of claim 12, wherein said processor is further programmed to:
compile case details associated with the fault, the case details including at least one of a fault code associated with the fault, a case title, an identifier of an electronic logbook that reported the fault, a description of the fault, and a reference list including references available to analyze the fault;
correlate a Fault Isolation Manual (FIM) number with the case details; and
display a FIM section that provides detailed steps for troubleshooting the fault when a maintenance person selects the FIM number in a maintenance application in communication with the fault analysis module.

14. The fault analysis module of claim 12, wherein to generate the recommendation, said processor is further programmed to display for each part of the plurality of parts, at least one of Time Spent to Install (TSI), Mean Time between Failure (MTBF), Mean Time between Nonscheduled Removal (MTBNR), whether the part is in stock, and whether the part is under warranty.

15. The fault analysis module of claim 12, wherein said processor is further programmed to:
receive, from a maintenance person, a selection of a part to be removed, the selection input by the maintenance person in a maintenance application in communication with the fault analysis module; and
display at least one of specific part details for the selected part, supplier information associated with a supplier of the part, part illustrations retrieved from an illustrated parts catalog, and detailed part statistics.

16. The fault analysis module of claim 12, wherein said processor is further programmed to receive a maintenance record that includes a part number of a part removed from the vehicle based on the list of the plurality of parts generated by the fault analysis module, the maintenance record received from the maintenance person using a maintenance personnel computing device.

17. The fault analysis module of claim 16, wherein to determine the fixed effectiveness rate, said processor is further programmed to:
extract a replacement success indicator from the maintenance record, the replacement success indicator indicating whether a replacement part installed on the vehicle successfully fixed the fault;
upon extracting the replacement success indicator, increment a first fixed effectiveness counter to increase a number of times the part number has been replaced for the fault;
when the extracted replacement success indicator indicates that the replacement part fixed the fault, increment a second fixed effectiveness counter to increase a number of times the replacement part successfully fixed the fault; and
calculate a ratio between the second fixed effectiveness counter and the first fixed effectiveness counter.

18. The fault analysis module of claim 16, wherein to determine the NFF rate, said processor is further programmed to:
extract test results from the maintenance record, the test results indicating whether a supplier determined the removed part caused the fault or the removed part had NFF;
upon extracting the test results, increment a first NFF counter to increase a number of times the part number has been tested;
when the extracted test results indicate NFF for the removed part, increment a second NFF counter to increase a number of times the part number had NFF; and
calculate a ratio between the second NFF counter and the first NFF counter.

19. The fault analysis module of claim 16, wherein said processor is further programmed to:
receive the maintenance record including a unique part identifier associated with the removed part; and
store the maintenance record in a database.

20. The fault analysis module of claim 19, wherein the removed part is sent to a part supplier for testing, said processor is further programmed to:
receive the unique part identifier input by the part supplier using a part supplier computing device;
retrieve the maintenance record for the removed part using the unique part identifier;
display the maintenance record to the part supplier;

receive test results for the removed part input by the part supplier; and store the maintenance record including the test results in the database.

* * * * *